July 13, 1954
T. W. MERRITT
2,683,437
MILKING SYSTEM
Filed Nov. 1, 1950
4 Sheets-Sheet 1
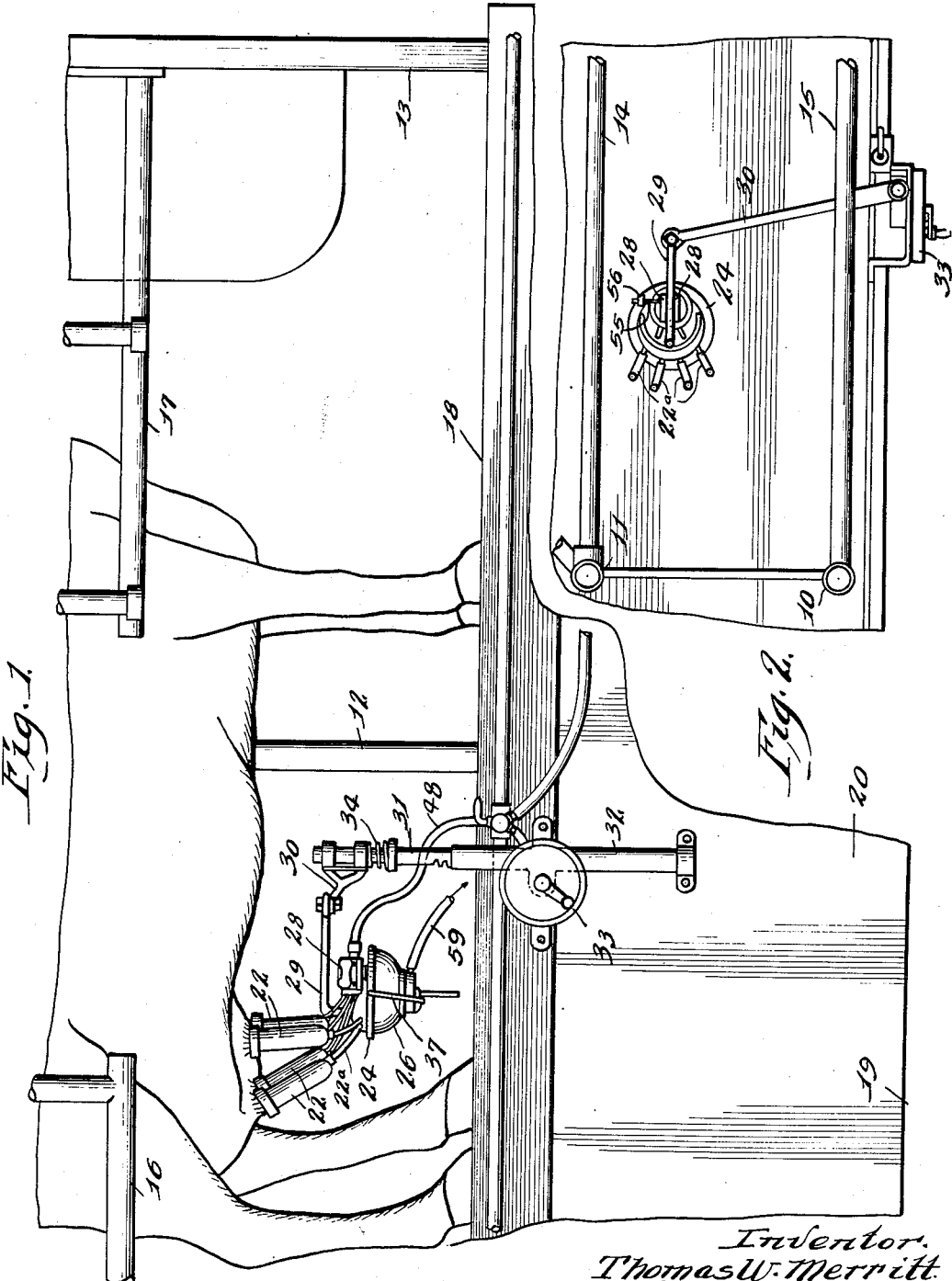
Inventor.
Thomas W. Merritt
Schroeder, Merriam,
By Hofgren & Brady.
Attorneys.

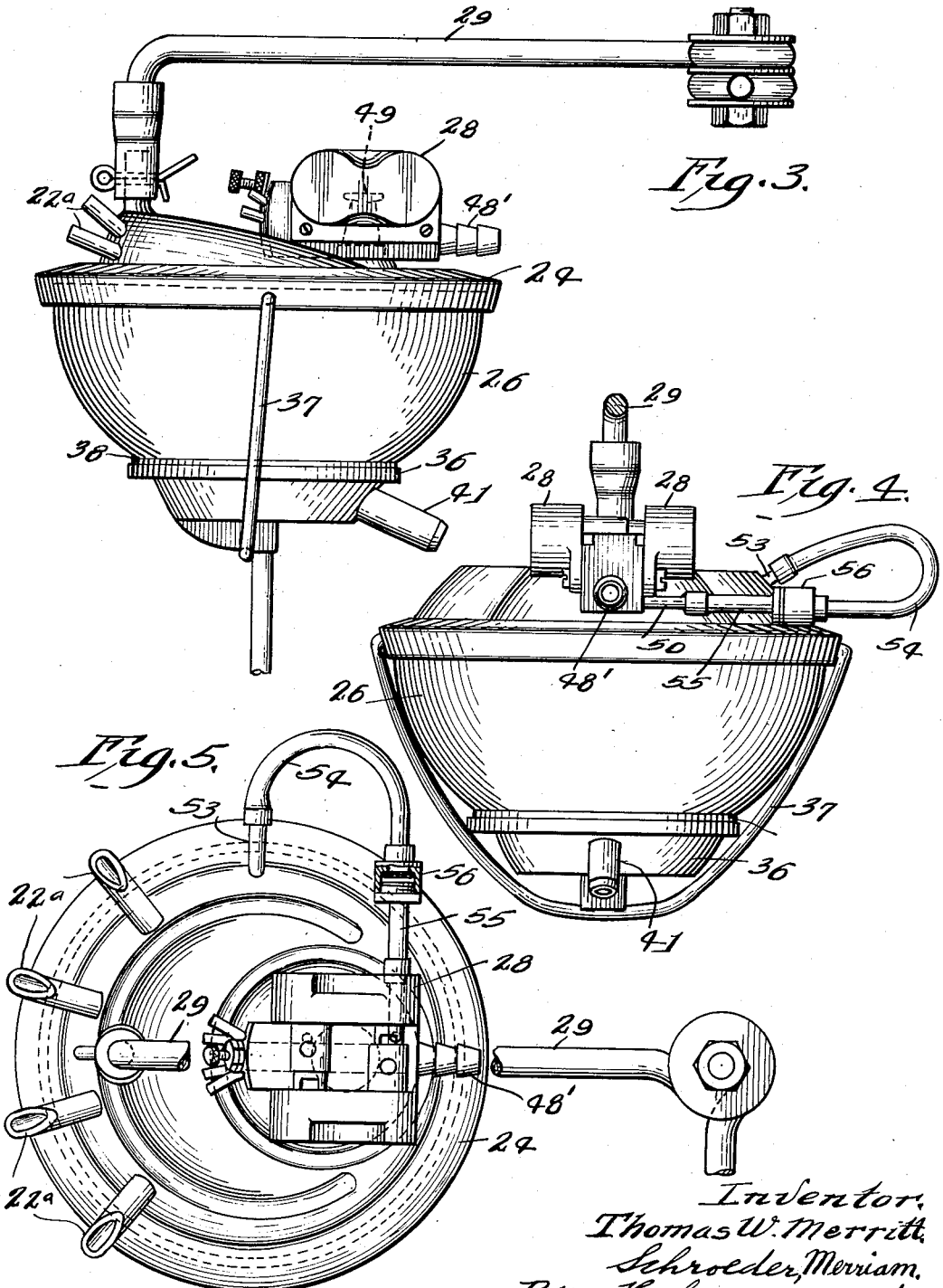

July 13, 1954 T. W. MERRITT 2,683,437
MILKING SYSTEM
Filed Nov. 1, 1950 4 Sheets-Sheet 3
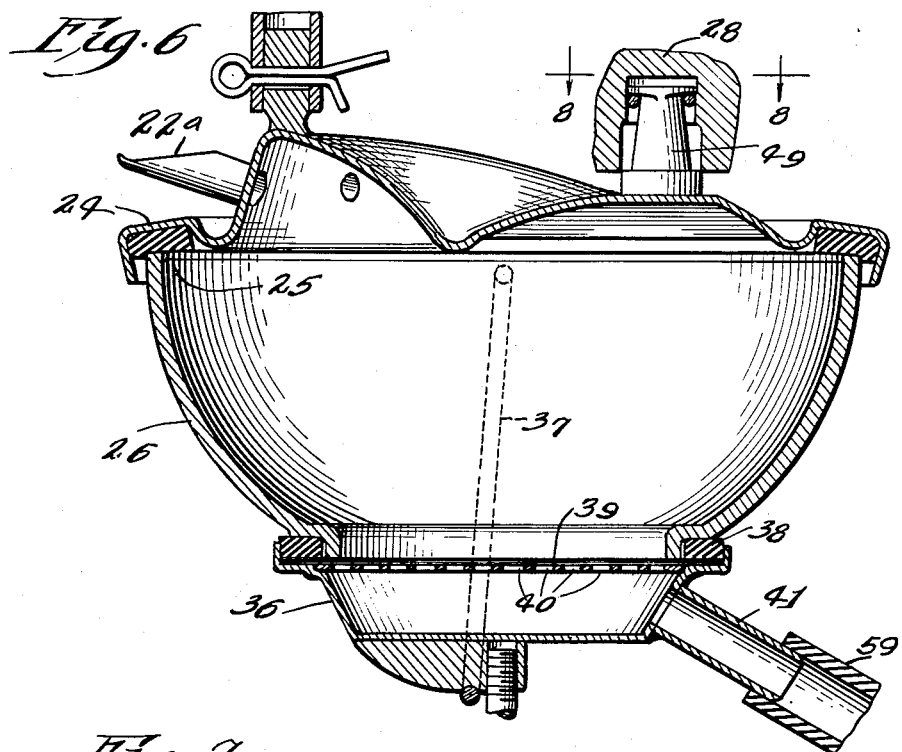
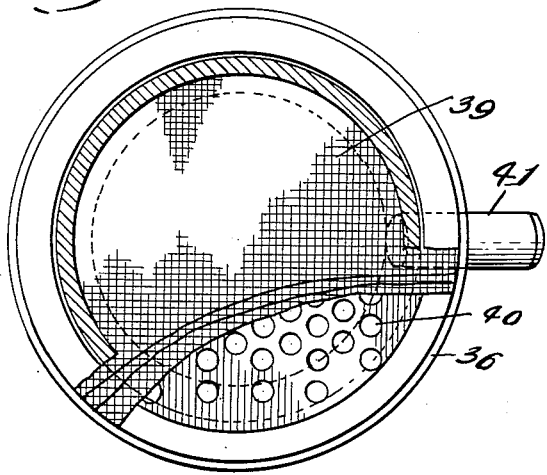
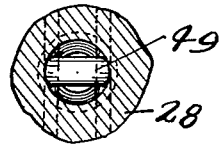
Inventor.
Thomas W. Merritt.
By Schroeder, Merriam,
Hofgren & Brady.
Attorneys.

July 13, 1954 T. W. MERRITT 2,683,437
MILKING SYSTEM
Filed Nov. 1, 1950 4 Sheets-Sheet 4
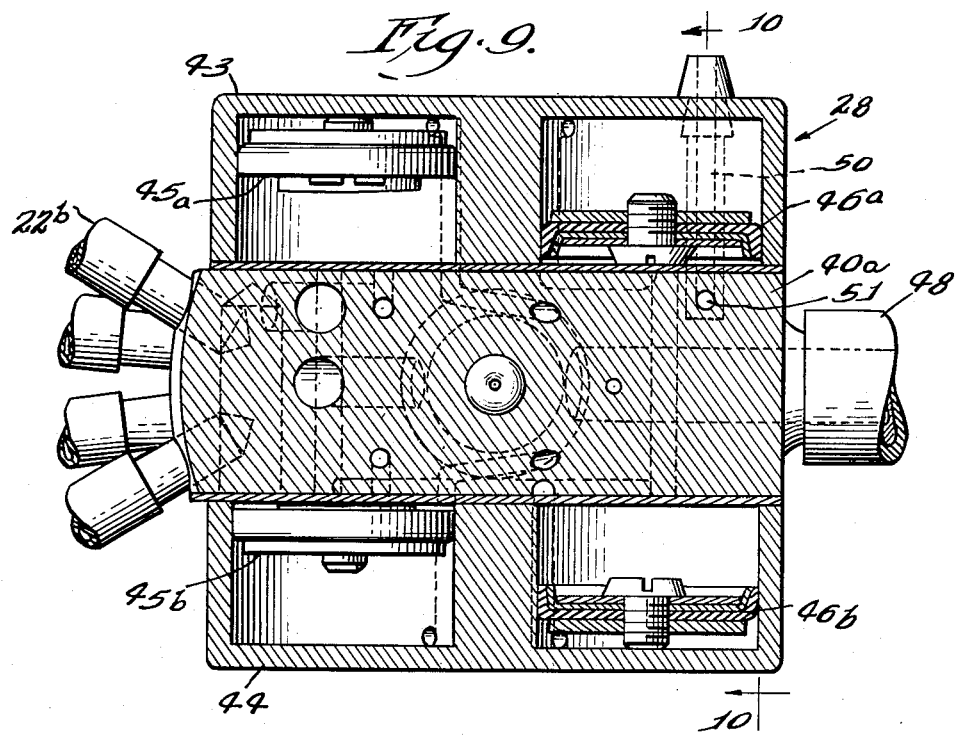
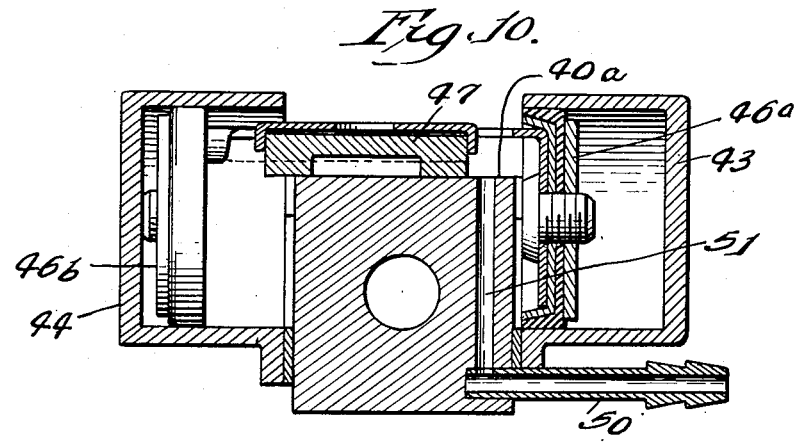
Inventor.
Thomas W. Merritt.
Schroeder, Merriam,
Hofgren & Brady.
By Attorneys.

Patented July 13, 1954

2,683,437

UNITED STATES PATENT OFFICE 2,683,437

MILKING SYSTEM

Thomas W. Merritt, St. Charles, Ill., assignor to
Babson Bros. Co., a corporation of Illinois Application November 1, 1950, Serial No. 193,484

7 Claims. (Cl. 119—14.36)

This invention relates to a milking system, especially for use in milking cows, and more particularly to milking apparatus including means for opening and closing communication between atmosphere and a portion of the milk passageway in synchronization with pulsator operation during milking.

One feature of this invention is that it provides improved milking apparatus of the kind adapted to draw milk from a cow and deliver it substantially continuously through a milk tube or pipe to a container of any desired kind, as a milk can of the type normally used for moving milk from a farm to a milk plant, or to a storage tank, a cooler, a pasteurizer, or the like; another feature of this invention is that it overcomes a difficulty, heretofore normally found in all continuous or "pipe line" milking systems, of having the milk withdrawn from the teats moving forwardly, then backing up somewhat, then again moving forwardly, etc.; yet a further feature of this invention is that it provides means for causing the milk to flow relatively uniformly and continuously to the desired delivery point; still another feature is that, in milking apparatus including an inflation having a flexible portion for receiving a teat and pulsator means for alternately expanding and contracting the teat receiving portion of the inflation, it provides a valve operated in synchronization with the pulsator for periodically opening and closing communication between atmosphere and the milk passageway; yet a further feature of this invention is that the size of the opening thus periodically provided between atmosphere and the milk passageway, and the timing of valve operation relative to pulsator operation, is such that sufficient air is admitted to facilitate the expansion of the inflations during the expansion portion of the cycle of their operation, while still enabling relatively continuous flow of milk through the milk passageway toward the ultimate delivery point, regardless of the character of the delivery point, without at the same time reducing the vacuum in the milk passageway to an undesirable extent, normally not over two or three inches reduction in vacuum.

Other features and advantages of this invention will be apparent from the following specification and the drawings, in which:

Figure 1 is a fragmentary side elevational view of a part of a milking parlor, showing a portion of a single stall and a part of the associated milking apparatus embodying my improvements;

Figure 2 is a plan view of a portion of the milking parlor similar to that shown in Figure 1, but without the cow;

Figure 3 is an enlarged side elevational view of the chamber forming a part of the milk passageway, and into which the milk tubes of the four inflations normally are directly connected to deliver their milk;

Figure 4 is an end elevational view of the device shown in Figure 3, the view being taken from the right of Figure 3;

Figure 5 is a top plan view of the apparatus shown in Figure 3;

Figure 6 is an enlarged vertical longitudinal sectional view through the chamber or "bowl" illustrated in Figure 3;

Figure 7 is a view of the bowl with the lid removed, and part of the bottom broken away;

Figure 8 is a fragmentary sectional view along the line 8—8 of Figure 6, showing the connection between the pulsator and the supporting post therefor;

Figure 9 is an enlarged horizontal sectional view of the pulsator, particularly designed to show the port and passageway forming a part of the air connection means with which this application is particularly concerned; and Figure 10 is a transverse sectional view along the line 10—10 of Figure 9, showing the relationship of the port and passageway mentioned immediately above and one of the slide valves normally found in a pulsator of the character with which this invention is illustrated.

In the particular embodiment of the invention illustrated here, the milking parlor in connection with which it is disclosed is illustrated as employing the "drop" system, with the cow floor being at a higher level than the operator's floor or alley, as may be best seen in Figure 1. Milking parlors of this general type are more fully described in a number of issued patents and other pending applications, and reference may be had, for example, to Babson et al. Reissue Patent No. 22,368, and Babson et al. Patent 2,477,035 to supplement the present disclosure with respect to the general features of such milking parlors and stalls. In such milking parlors the cows, after any desired preliminary washing of the udder or other preparation, are admitted to a stall, as for example, the stall shown in Figures 1 and 2 as including the vertical uprights 10, 11, 12 and 13, the overhead horizontal bracing members here identified as 14 and 15, and side horizontal members as for example those here identified as 16 and 17. The stall illustrated is shown in simplified form without a feed chute, gate operating equipment, and the like, for convenience and simplicity of illustrations. It will be understood that in commercial practice the stall would normally include such additional equipment or accessories as those mentioned above, and others illustrated and described in the above mentioned patents.

In the system illustrated, the cow stands on a floor, here identified as 18, which would be at some suitable higher level (as two feet) above an operator's floor or alley here identified as 19, a vertical wall 20 connecting the two floor levels. While I prefer to have a stepped arrangement of stalls and floors as illustrated in the above mentioned patents, the stall is here shown as parallel to the wall 20 for simplicity of illustration.

The milking apparatus in which the present invention is particularly adapted for use, and the apparatus here illustrated and described, is of a kind sometimes known in the trade as a "pipe-line" type to distinguish it from a milking machine which receives a given amount of milk directly and which must be emptied between the milking of each cow. The system illustrated here is of a character which can be attached to cows as they move into the stall of a milking parlor, and which will deliver milk to a tube or pipe adapted to deliver it to any desired point, either a milk can immediately adjacent the milking stall or at some remote point, or through a sanitary pipe line to other apparatus found in the milk houses and dairy installations of the larger dairy farms, as coolers, storage tanks, pasteurizers, or the like. The general character and nature of such a system will only be described here to such an extent as is necessary to enable an understanding of the proper relation to the remainder of the system of the particular improvement to which this application is directed.

In general, as may be seen first by reference to Figure 1, the system includes four teat cup assemblies of identical character, one being here identified as 22. Each such teat cup assembly comprises a rigid outer shell and a flexible inner element termed an inflation, this inflation comprising a larger generally cylindrical body adapted to receive the teat being milked, and usually comprising an integral short milk tube 22a extending therefrom and forming a part of the milk passageway delivering milk on through various supplemental parts of the passageway to the desired ultimate destination point. Such teat cup assemblies and inflations are so well known and have been so long used in the field that it is not felt that further illustration or description is necessary. The four teat cup assemblies may be connected together in any desired manner to deliver milk to a single flow passageway, being here shown as having their milk tubes connected to nipples on a lid here identified as 24, this lid forming the top of a milk receiving chamber of substantial size, the remainder of the chamber being provided by a bowl shaped element here identified as 26. The lid carries, suitably mounted thereon, a pulsator 28 of a type well known and (except for the presence of means forming part of the present invention and hereafter described in more detail) conventional in the field, and the entire bowl assembly is supported by apparatus including a pair of pivotally interconnected arms 29 and 30 in turn supported on a vertically adjustable post 31.

The particular adjustable supporting arrangement here illustrated is of a type more fully shown and described in Babson et al. Reissue Patent No. 22,368. The post 31 may be vertically adjusted to a desired position by telescopic movement within a tube 32 in turn suitably mounted, this mounting being here illustrated as on the side of the wall of the milking parlor installation, although it will be understood that this is representative only. Adjustment may be effected by the handle 33 through a rack and gear arrangement; and a spring 34 is adapted to place continuous forward force on the milking apparatus during milking, so that by appropriate adjustment of the height of the support a downward and forward intermittent tug and pull will be applied to the teat during milking with an intermittent effect due to the pulsator action. The height adjustment is preferably made in such a manner that when the teat cups are placed on the teats there is some upward bending of at least the arm 29, so that the springiness of this arm provides the downward component of force which, together with the forward component of force due to the spring 34, provide a steady downward and forward force which is converted into a periodic tug and pull on the teats as a result of pulsator operation and movement of the teat cup assemblies on the teats due to changes in vacuum.

As is more fully explained in the above mentioned applications, the cup or bowl 26 (preferably of transparent material as Lucite or Plexiglass or other non-shattering and non-cold flowing transparent plastic, to facilitate checking the progress of milking and the condition of the milk) gets the milk away from the teats and prevents it from backing up around the teats.

The cup or bowl provides a chamber of substantial volume or capacity enabling each "pulse" of milk delivered from the inflation to separate from the ends of the milk tubes and not be drawn back around the teats as the inflations expand on the next portion of pulsator operation, this desired "break" in the milk stream being greatly assisted and improved by the timed valve operation forming the subject matter of this particular application. In milking, of course, is of the double acting type conventional for several decades, alternate evacuation of air from and admission of air to the space between the rigid outer shells and the inner inflations being effected by the pulsator 28 through appropriate pulsator hoses or tubes.

Referring now more particularly to Figures 3 to 8 inclusive, the general construction of the bowl 26 and its associated parts will be described briefly in order to better bring out the present invention and its relation thereto to the remainder of the milking system illustrated. The bowl may be of convenient size, as for example of the order of a quart, and is adapted to have sealed to its top, as by a gasket 25, the lid 24. The lid illustrated is of a type heretofore used on milking machines and is the subject of Thomas Design Patent 156,852, and the co-pending Thomas application No. 9,088, filed February 18, 1948, now Patent 2,610,609, dated September 16, 1952. A removable connection of appropriate type is provided between the supporting arm 29 and the lid 24; and means are provided for holding a bottom closure 36 on the bowl, this being here shown as in the form of a snap bail 37. This bottom closure for the main body of the bowl is adapted to be sealed to the bowl by another gasket 38, which may be best seen in Figure 6; and a filter pad of conventional type, here identified as 39 may be supported by a perforated plate 40 so that milk leaving the bowl 26 through the outlet connection pipe or nipple 41 will be filtered in desired manner.

It will be seen that the pulsator identified in general as 28 is generally of a conventional type including a center block portion 40a and pair of side piston and cylinder assemblies here identified in general as 43 and 44. Each cylinder assembly has therein a pair of pistons, as the "front" pistons 45a and 45b interconnected by one sliding valve member overlying the top of the center block 40a, and the other or "rear" pair of pistons here identified as 46a and 46b, these being interconnected by another similar slide member here identified as 47. Vacuum is admitted to the pulsator through the hose 48 connected to nipple 48' during the milking operation, the pulsator here being illustrated as supported on a post 49 by a removable but locking connection which may be best seen in Figures 6 and 8. That is, the opening in the pulsator 28 adapted to receive the post is elongated in character in one direction and the post has a top construction providing an elongation in another direction, so that the pulsator would be placed in position at right angles to its normal ultimate position of use and then turned to the position of use, where it is locked on the post.

In general, the operation of the pulsator is effected by a small amount of air movement under the influence of the vacuum, this air movement being adapted to be regulated by manually operable restricting valve means (not shown), which may be a needle valve or other type of valve. The general construction and operation of such a pulsator, for example, is illustrated in Fosler Patent No. 1,376,804 and in Babson Patent No. 2,464,917, issued March 22, 1949. In general, the rear pistons 46a and 46b and their interconnecting slide valve 47 acts as timing means, with the front pistons 45a and 45b and their similar slide valve effecting inter-connection of the pulsator tubes (as the tube 22b) alternatively to vacuum and atmosphere in order to create alternate vacuum and atmospheric conditions within the space between the outer shell and inner inflations of each teat cup assembly. The vacuum maintained in the milk passageway, including the milk tubes of the inflations, the bowl 26, and the tube 59 leading from the bowl outlet 41 to the desired ultimate destination, would normally be one or two inches lower than the vacuum delivered to the pulsator 28 through the vacum tube 48, so that when vacuum is present to the outside of the inflation by virtue of pulsator action the inflations tend to expand; and when atmospheric air is admitted to the space around the outside of the inflation they tend to collapse, both operations being a function of pressure differentials within and without the flexible inflation element around the teat. It will be understood that milk is normally delivered from the teat during that portion of the cycle of operation in which the inflation is expanded; and that the contracted portion of the cycle provides a rest period for the teat and a period during which milk can again flow down the ducts within the udder to the milk cistern communicating with the teat.

In the rear of the pulsator block (the terms "front" and "rear" are used with reference to closeness to the udder, and not to the head of the cow), I have provided an additional passageway 51 extending down vertically through the block and communicating with a connector nipple member 50. These provide a passageway which is completely independent of any of the other passageways within the pulsator; and the upper end of the vertical passageway 51, where it passes through the top of the block 40a, provides an additional port adapted to be covered and uncovered by the slide member 47 during the normal periodic movement of such slide block as a function of pulsator operation.

As will be readily apparent, this results in the passageway provided by the passageway 51 nipple 50 being alternately closed and opened to atmosphere (as illustrated in Figure 10) as a function of the position of the slide member 47. Accordingly, this provides means adapted to open and close communication between atmosphere and some desired point of the milk passageway in a manner which is synchronized with and effected by and in accordance with pulsator operation.

I preferably so relate the parts that the valve opens the passageway 51 at the commencement of, or just ahead of, that portion of the pulsator operation which expands the inflation; and preferably keeps this passageway open during the time that the inflations are expanding, but then closes it again at or about the time that expansion has been completed.

As may be best seen in Figure 5, communication is provided between the nipple 50 and another nipple 53 provided in the lid 24 for the special purposes of this invention. The communication between these two nipples is here shown as completed by a hose illustrated as comprising two portions identified as 54 and 55, with an intermediate air filter device identified as 56. This air filter would normally comprise a small chamber and screen, and its purpose is to block any small bits of straw or other foreign matter which might otherwise move into the milk passageway during movement of air to that passageway while the valve means forming the subject matter of this invention is open to provide communication between atmosphere and the interior of the bowl 26. I have also found it desirable to make the effective passageway opening of appreciable size so that the effective opening would be about equivalent to that of about a ⅛ inch opening drilled in the lid. This permits movement of a sufficient quantity of air into the bowl and milk passageway during the time when the inflations are expanding to replace the additional volume provided by such expansion and to drop the vacuum in the bowl slightly, but not too much, preferably in the order of an inch or two drop in pressure where a vacuum such as 13 to 15 inches of vacuum is being used. Since the vacuum on the other end of the milk delivery tube 59 remains substantially constant the amount of air moving into the milk passageway while this valve is open not only permits expansion of the inflations without any backward movement of the milk, but even assists continuous flow of milk toward the delivery point through the milk passageway and out of the bowl by virtue of somewhat reducing the vacuum above the surface of the milk in the bowl, assisting passage of the milk through the filter and out through the outlet opening 41 and milk tube 59. On the other hand, the valve and communication to atmosphere are closed during at least the major part of that portion of the pulsator operation which effects collapsing of the inflation, and preferably also during the major part of the previous portion of the operation cycle in which the inflations stood expanded, so that there is no undesirable further reduction of vacuum during the "rest" period of the milking cycle provided by the contraction of the inflations, and the full vacuum within the milking line and milking passageway is available for milk withdrawal from the teats when the inflations again start to expand, or at least shortly after they have become expanded.

While I prefer to open communication between the milk passageway and atmosphere slightly before the expansion of the inflations commences, and to close it at or about the time of completion of expanding movement of the inflation walls, it is to be understood that this timing is not critical. The important point is to have open communication during at least a substantial part of the expansion or outward movement of the inflation walls, and to have such communication closed off during at least the major portion of the remainder of the cycle of inflation operation; and that when I speak of communication as being opened "during expansion" of the inflations and closed "during contraction" these terms are merely being used with general reference to each other and are not to be interpreted as excluding the normal situation contemplated by me wherein commencement and termination of the related operations do not exactly coincide.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Milking apparatus of the character described, including: milk withdrawing means comprising a teat cup assembly including an inflation having a flexible portion for receiving a teat and a milk tube leading therefrom; milk conduit means communicating with said milk tube and providing a milk passageway; pulsator means connected to the teat cup assembly and to a source of vacuum for alternately expanding and contracting the teat-receiving portion of the inflation; means normally maintaining a vacuum within said milk passageway; air conduit means communicating with said milk passageway and atmosphere; and a valve in said air conduit, means connecting the valve to the pulsator for operation by and in synchronization therewith for periodically opening and closing communication between atmosphere and said milk passageway.

2. Milking apparatus of the character described, including: milk withdrawing means comprising a teat cup assembly including an inflation having a flexible portion for receiving a teat and a milk tube leading therefrom; milk conduit means communicating with said milk tube and providing a milk passageway; pulsator means connected to the teat cup assembly and to a source of vacuum for alternately expanding and contracting the teat-receiving portion of the inflation; means constantly maintaining a vacuum within said milk passageway; air conduit means communicating with said milk passageway at a point closely adjacent said milk tube and with atmosphere; a valve in said air conduit, and means connecting the valve to said pulsator to be periodically operated thereby for opening communication between atmosphere and said milk passageway during expansion of said teat-receiving inflation portion to prevent a substantial increase in the vacuum in said milk passageway upon expansion of said inflation.

3. Milking apparatus, including: milk withdrawing means including four teat cup assemblies including inflations each having a flexible portion for receiving a teat and a milk tube leading therefrom; milk conduit means providing a milk passageway communicating with each of said four milk tubes; pulsator means connected to the teat cup assemblies and to a source of vacuum for alternately expanding and contracting the teat-receiving portion of the inflation; means constantly maintaining a vacuum within said milk passageway; air conduit means communicating with said milk passageway at a point closely adjacent the point of communication between said milk passageway and said milk tubes and with atmosphere; a valve in said air conduit, and means connecting the valve to said pulsator to be operated thereby for opening communication between atmosphere and said milk passageway during expansion of said teat-receiving inflation portion and closing off said communication during at least the major portion of the remainder of the cycle of operation thereof to prevent a substantial increase in the vacuum in said milk passageway upon expansion of said inflation.

4. Milking apparatus, including: milk withdrawing means including four teat cup assemblies including inflations each having a flexible portion for receiving a teat and a milk tube leading therefrom; milk conduit means providing as part of a milk passageway a single chamber of substantial volume communicating directly with each of said four milk tubes; pulsator means connected to the teat cup assemblies and to a source of vacuum for alternately expanding and contracting the teat-receiving portion of the inflation; means constantly maintaining a vacuum within said milk passageway; air conduit means communicating with said chamber and atmosphere and having a portion in the pulsator means; a valve in the portion of said air conduit in said pulsator means, and means for operating said valve in synchronization with said pulsator for periodically opening and closing communication between atmosphere and said milk passageway to prevent a substantial increase in the vacuum in said milk passageway upon expansion of said inflation.

5. Apparatus of the character claimed in claim 1, wherein said pulsator means includes a block and a slide movable thereon and said valve comprises a port in said block opened and closed by said slide.

6. Milking apparatus, including: milk withdrawing means including four teat cup assemblies including inflations each having a flexible portion for receiving a teat and a milk tube leading therefrom; milk conduit means providing as part of a milk passageway adapted to have milk move substantially continuously therethrough a single chamber of substantial volume communicating directly with each of said four milk tubes; pulsator means connected to the teat cup assemblies and to a source of vacuum for alternately expanding and contracting the teat-receiving portion of the inflation, this pulsator means including a block and a slide movable thereon and having therein a control valve which comprises a port in said block opened and closed by said slide and independent of all other ports in said pulsator means; means operatively connected with said milk conduit means for normally maintaining a vacuum within said milk passageway; air conduit means communicating with said chamber at a point above the normal maximum level of milk therein and with atmosphere and having a portion in the pulsator means said portion including said control valve in said pulsator means for opening communication between atmosphere and said milk passageway during expansion of said teat-receiving inflation portion and closing off said communication at or about the completion of said expansion.

7. Apparatus of the character claimed in claim 4, wherein said air conduit provides direct communication between atmosphere and an upper portion of the chamber in the milk passageway through said valve.

References Cited in the file of this patent

UNITED STATES PATENTS

| Number | Name | Date |
|---|---|---|
| 784,780 | Burrell | Mar. 14, 1905 |
| 828,613 | Lane | Aug. 14, 1906 |
| 854,268 | Burrell | May 21, 1907 |
| 1,195,995 | Leitch | Aug. 29, 1916 |
| 1,195,998 | Leitch | Aug. 29, 1916 |
| 2,464,917 | Babson | Mar. 22, 1949 |